(12) United States Patent
Jito et al.

(10) Patent No.: US 6,743,369 B2
(45) Date of Patent: Jun. 1, 2004

(54) METHOD FOR MANUFACTURING ELECTRODE FOR SECONDARY BATTERY

(75) Inventors: Daizo Jito, Hirakata (JP); Hisaki Tarui, Shijyonawate (JP)

(73) Assignee: Sanyo Electric Co., Ltd., Osaka (JP)

( * ) Notice: Subject to any disclaimer, the term of this patent is extended or adjusted under 35 U.S.C. 154(b) by 35 days.

(21) Appl. No.: 10/015,774

(22) Filed: Dec. 17, 2001

(65) Prior Publication Data
US 2002/0117469 A1 Aug. 29, 2002

(30) Foreign Application Priority Data
Dec. 22, 2000 (JP) ........................................ 2000-390867

(51) Int. Cl.$^7$ ................................................ H01M 4/04
(52) U.S. Cl. ........................... 216/13; 216/34; 216/35; 216/37; 216/66; 216/67; 216/75; 216/78; 204/192.1; 204/192.11; 204/192.12; 204/192.15; 204/192.34; 205/50; 427/255.28; 427/422; 427/448; 427/452; 427/527; 427/534; 427/535; 427/568; 427/578; 429/218.1; 429/232; 429/245
(58) Field of Search ..................... 216/13, 34–35, 216/37, 66–67, 75, 78; 204/192.1, 192.11, 192.12, 192.15, 192.34; 205/50; 427/255.28, 422, 448, 452, 527, 534–535, 568, 578; 429/218.1, 232, 245

(56) References Cited

U.S. PATENT DOCUMENTS

| | | | | |
|---|---|---|---|---|
| 5,162,178 A | * | 11/1992 | Ohsawa et al. | 429/213 |
| 5,518,839 A | * | 5/1996 | Olsen | 429/304 |
| 5,578,396 A | * | 11/1996 | Fauteux et al. | 429/209 |
| 5,591,544 A | * | 1/1997 | Fauteux et al. | 429/209 |
| 5,846,675 A | * | 12/1998 | Sazhin et al. | 429/245 |
| 6,059,847 A | * | 5/2000 | Farahmandi et al. | 29/25.03 |
| 2002/0177044 A1 | * | 11/2002 | Yagi et al. | 429/231.95 |
| 2003/0138554 A1 | * | 7/2003 | Yagi et al. | 427/126.3 |

FOREIGN PATENT DOCUMENTS

| | | | | |
|---|---|---|---|---|
| JP | 9-283125 A | 10/1997 | | |
| JP | 10-255768 A | 9/1998 | | |
| JP | 11-158652 A | 6/1999 | | |
| JP | 11158652 A | * 6/1999 | ........... C23C/22/63 |
| JP | 11-250900 A | 9/1999 | | |
| JP | 11250900 A | * 9/1999 | ........... H01M/4/04 |
| JP | 11-297330 A | 10/1999 | | |
| JP | 2000-243383 A | 9/2000 | | |

\* cited by examiner

Primary Examiner—Anita Alanko
(74) Attorney, Agent, or Firm—Kubovcik & Kubovcik

(57) ABSTRACT

A method of manufacturing an electrode for a secondary battery by depositing a thin film composed of active material on a current collector in which a surface-treated layer such as an antirust-treated layer is formed, including the steps of: removing at least part of the surface-treated layer by etching the surface of the current collector with an ion beam or plasma in order to improve the diffusion of the current collector material into the active material thin film; and depositing the thin film on the surface of the current collector subjected to the etching step.

9 Claims, 1 Drawing Sheet

METHOD FOR MANUFACTURING ELECTRODE FOR SECONDARY BATTERY

BACKGROUND OF THE INVENTION

1. Field of the Invention

The present invention relates to a method for manufacturing an electrode for a secondary battery such as a lithium secondary battery, and more specifically, to a method for manufacturing an electrode for a secondary battery obtained by depositing a thin film composed of active material on the current collector.

2. Related Art

In lithium secondary batteries which have been studied and developed enthusiastically in recent years, an electrode used therein has great influence on their battery properties such as charge/discharge voltage, charge/discharge cycle life characteristics, and storage characteristics. Therefore, it has been attempted to enhance the battery properties by improving active materials.

Using lithium metal as negative active material can realize a battery with high energy density both per weight and per volume; however, it causes the problem that lithium is deposited in the form of dendrite during a charge, which leads to an internal short-circuiting.

On the other hand, it is reported that another type of lithium secondary battery using, as an electrode, aluminum, silicon, tin, or the like which is electrochemically alloyed with lithium during a charge. Among these materials, silicon with a high theoretical capacity is promising as the negative electrode for a battery with a high capacity, and various types of secondary batteries with this negative electrode have been suggested (Japanese Patent Laid Open No. 10-255768). However, in these types of alloy electrodes, the alloy which is active material is pulverized during a charge/discharge and deteriorates current collecting properties, so sufficient cycle characteristics are not obtained.

We have already found out that a lithium secondary battery with a capacity as high as around 4000 mAh/g and with cycle characteristics good enough for practical use can be obtained by using, as an electrode, a microcrystalline silicon thin film or an amorphous silicon thin film formed on a copper foil by CVD or sputtering method (International Publication WO01/31720A1 and others)

We have also found out that in this electrode the silicon thin film must have excellent adhesion to the copper foil, which is the current collector, and that this adhesion is obtained by the copper element from the copper foil being diffused in the silicon thin film to form a solid solution. We have further found out that an intermetallic compound between silicon and copper formed from too much diffusion of the copper element into the silicon thin film causes a decrease in adhesion and capacity. Hence, in manufacturing such an electrode, it is important to control the diffusion of the current collector material into the thin film of active material.

SUMMARY OF THE INVENTION

The object of the present invention is to provide a method for manufacturing an electrode for a secondary battery with excellent cycle characteristics, in which the adhesion between a current collector and a thin film can be improved by controlling the diffusion of the current collector material into the thin film.

The present invention is a method for manufacturing an electrode for a secondary battery by depositing a thin film composed of active material on a current collector in which a surface-treated layer is formed, comprising the steps of: removing at least part of the surface-treated layer by etching the surface of the current collector with an ion beam or plasma in order to improve the diffusion of the current collector material into the thin film; and depositing the thin film on the surface of the current collector subjected to the etching step.

When the presence of a surface-treated layer suppresses the diffusion of the current collector material into the active material thin film, according to the present invention, it is possible to promote the diffusion of the current collector material into the thin film, thereby obtaining excellent adhesion.

As the current collector for a secondary battery such as a lithium secondary battery, a metallic foil such as a copper foil is generally used. The surface of the metallic foil is generally subjected to an antirust treatment in order to prevent corrosion. As an antirust treatment, chromate treatment, silane coupling treatment, and benzotriazol treatment are known. Even when such an antirust treatment is not applied, an oxide film may be formed in the surface of the metallic foil.

We have found that when an electrode for a secondary battery is manufactured by depositing a thin film composed of active material on a metallic foil by CVD or sputtering method, the metallic atoms or molecules with high energy collide with the surface of the current collector and the temperature of the current collector increases, making a component of the current collector diffuse into the thin film. In the area where the current collector material is diffused, a solid solution of the current collector material and the active material is formed, and the presence of the area with the solid solution improves the adhesion between the current collector and the thin film, thereby increasing the charge/discharge cycle characteristics.

The above-mentioned antirust-treated layer or oxide layer in the surface of the current collector suppresses the diffusion of the current collector material into the thin film so as to decrease the adhesion between the current collector and the thin film, making it easier for the thin film to delaminate from the current collector due to the stress resulting from expansion and shrinkage of the active material during a charge/discharge. According to the present invention, the antirust-treated layer or oxide film in the surface of the current collector can be removed as described above, and therefore it becomes possible to promote the diffusion of the current collector material into the thin film to obtain excellent adhesion.

On the other hand, there are cases that excessive diffusion of the current collector material into the thin film decreases the adhesion between the current collector and the thin film. For example, when a copper foil is used as the current collector, and a microcrystalline silicon thin film or an amorphous silicon thin film is provided thereon as a thin film of active material, if copper component is excessively diffused in the silicon thin film, an intermetallic compound is formed which may decrease the adhesion of the silicon thin film to the copper foil. Therefore, in such cases, it is preferable to control the etching degree of the surface-treated layer so as to improve the diffusion of the current collector material into the thin film within the range that the intermetallic compound of the active material and the current collector material is not formed.

In the etching step and the depositing step, it is preferable to control the temperature of the current collector in order to prevent the temperature from increasing to cause the current collector material to be diffused excessively. For example, in the etching step and the depositing step, it is preferable that the temperature of the current collector is controlled to be in the range of 20 to 250° C.

The etching step and the depositing step of the present invention can be performed in the same reaction chamber because they can be performed in a low pressure. Therefore, in the present invention, the etching step and the depositing step are preferably performed in succession in the same reaction chamber. Thus, an electrode for a secondary battery can be manufactured effectively.

In the present invention, the method of depositing a thin film on the current collector is not restricted particularly; there are other methods of forming a thin film from a vapor phase, such as CVD, sputtering, vacuum evaporation, or thermal spraying method. It is also possible to use a method of forming a thin film from a liquid phase, such as plating method.

When the current collector material is not sufficiently diffused into the thin film after the formation of the thin film, a heat treatment may be applied.

When a silicon thin film is used as the thin film, copper element (Cu) can be used as element easily diffused in the silicon thin film. Therefore, when a silicon thin film is formed as the thin film, a copper foil can be preferably used as the current collector. Such a copper foil includes a rolled copper foil and an electrolytic copper foil. We have found that an electrolytic copper foil is high in surface activity, so that copper is easily diffused into the silicon thin film. In addition, a high surface roughness Ra makes larger the interface area between the foil and the silicon thin film, which contributes to an increase in adhesion of the silicon thin film. Thus, it is preferable to use an electrolytic copper foil, when a copper foil is used as the current collector.

It is also possible to use a metallic foil whose surface portion is made of copper or its alloy. For example, it may be used, as the current collector, a metallic foil such as a nickel foil on the surface of which a copper layer is provided.

DESCRIPTION OF THE PREFERRED EMBODIMENTS

Figure 1:
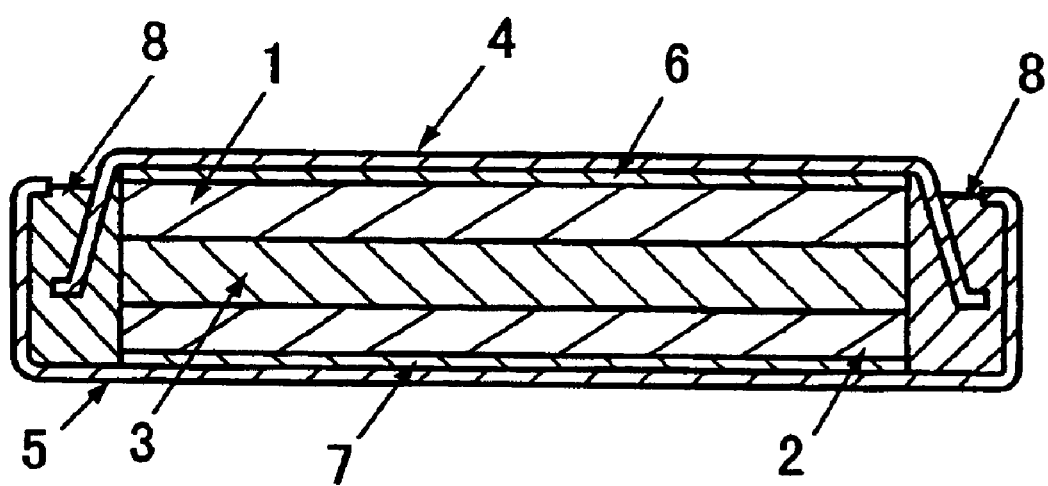
FIG. 1 is a cross sectional view showing a lithium secondary battery manufactured in the embodiment of the present invention.

The present invention will be described in detail based on specific embodiments as follows. However, the present invention is not restricted to the following embodiments; it can be performed by modifying variously within the scope of the present invention.

[Etching of Current Collector]

20 $\mu$m-thick electrolytic copper foil was subjected to a chromate treatment by immersing in a chromate treatment solution (chromic anhydride of 3.0 g/l, pH 1.7, and bath temperature of 25° C.) for 5 seconds and then it was used as a current collector. The amount of chromate coated in the electrolytic copper foil was about 0.02 mg-Cr/dm$^2$.

The current collector was fixed on the outer surface of a drum of about 20 cm in diameter arranged inside an ECR plasma generation apparatus provided with an ion gun. While the drum was being rotated, an argon ion beam was applied on the current collector to etch it under the conditions shown in Table 1, so as to obtain the current collectors of Examples 1 and 2. For comparison, a current collector not subjected to ion beam radiation was manufactured (Comparative Example 1).

TABLE 1

|  | Used Gas, Gas Flow(sccm) | ECR Power (W) | Ion Beam Radiation Duration Time (min.) |
|---|---|---|---|
| Example 1 | Ar, 40 | 300 | 10 |
| Example 2 | Ar, 40 | 300 | 20 |
| Comparative Example 1 |  | No Ion Beam Radiation |  |

[Formation of Silicon Thin Film]

Next, in the same apparatus, an amorphous silicon thin film was formed on each current collector by a sputtering method. The film formation conditions were an argon gas flow of 100 sccm and a radio-frequency power of 350 W, and single crystalline silicon was used as the target. The film forming duration time was 630 minutes. The obtained amorphous silicon thin film had a thickness of about 6 $\mu$m.

The obtained silicon thin films were observed, and the results are shown in Table 2.

TABLE 2

|  | Conditions of Obtained Thin Film |
|---|---|
| Example 1 | Excellent Adhesion |
| Example 2 | Excellent Adhesion |
| Comparative Example 1 | Partial Delamination |

In Table 2, "Excellent Adhesion" indicates the condition where the entire surface of the copper foil is coated with the silicon thin film immediately after the film formation, and no delamination occurs on the silicon thin film even when folded. Further, "Partial Delamination" indicates that the silicon thin film delaminated immediately after the film formation or when folded.

[Manufacture of Lithium Secondary Batteries]

Lithium secondary batteries were manufactured as follows by using the electrodes of Examples 1 and 2 and Comparative Example 1 as the negative electrode.

(Manufacture of Positive Electrode)

Li$_2$CO$_3$ and CoCO$_3$ used as start material were weighted to make Li and Co be in atomic ratio of 1:1 and mixed in a mortar. After it was press-formed in a mold with a diameter of 17 mm, it was baked for 24 hours at 800° C. in the air to obtain baked LiCoO$_2$. This was pulverized in a mortar until it had an average particle diameter of 20 $\mu$m.

80 parts by weight of the obtained LiCoO$_2$ powder, 10 parts by weight of acetylene black as a conductive material, and 10 parts by weight of polytetrafluoroethylene as a binder were mixed and press-formed in a mold with a diameter of 17 mm, so as to form a positive electrode in the form of pellet.

(Manufacture of Electrolyte)

LiPF$_6$, was dissolved to be 1 mol/liter in a mixture solution containing ethylene carbonate and diethyl carbonate in equal volume, and the obtained solution was used as electrolyte in manufacturing the following batteries.

(Manufacture of Batteries)

FIG. 1 shows a schematic cross sectional view of the manufactured lithium secondary battery, which includes a positive electrode 1, a negative electrode 2, a separator 3, a positive electrode can 4, a negative electrode can 5, a positive electrode current collector 6, a negative electrode current collector 7, and a polypropylene insulating packing 8.

The positive electrode 1 and the negative electrode 2 face each other with the separator 3 disposed therebetween. These components are accommodated inside a battery case composed of the positive electrode can 4 and the negative electrode can 5. The positive electrode 1 is connected to the positive electrode can 4 via the positive electrode current collector 6, and the negative electrode 2 is connected to the negative electrode can 5 via the negative electrode current collector 7, thereby enabling charge and discharge as a secondary battery.

[Evaluation of Charge/Discharge Cycle Characteristics]

The charge/discharge cycle characteristics of each lithium secondary battery thus manufactured were evaluated. A charge was conducted at 25° C. and a current value of 100 $\mu$A until the negative electrode capacity became 2000 mAh/g, and then a discharge was conducted. This charge/discharge cycle was repeated 10 times for each battery. The charge/discharge efficiency on the 10th cycle and the capacity retention after 10 cycles defined in the following formulas were calculated and shown in Table 3.

Charge/discharge efficiency (%) on the 10th cycle= (discharge capacity on the 10th cycle)/(charge capacity on the 10th cycle)×100

Capacity retention (%) after 10 cycles=(discharge capacity on the 10th cycle)/(discharge capacity on the first cycle)× 100

TABLE 3

|  | Charge/Discharge Efficiency On the 10th Cycle (%) | Capacity Retention After 10 Cycles (%) |
| --- | --- | --- |
| Example 1 | 99.7 | 100.2 |
| Example 2 | 99.8 | 97.6 |
| Comparative Example 1 | 99.6 | 97.0 |

As apparent from the results shown in Table 3, the charge/discharge cycle characteristics are excellent in the lithium secondary batteries using, as the negative electrode, the electrodes of Examples 1 and 2 manufactured according to the present invention.

When the etching process takes too long, the current collector material is diffused too much, which may decrease the characteristics. Therefore, a preferable process duration will be less than 20 minutes or so.

In the above examples, the present invention is applied to the copper foil subjected to the antirust treatment by means of a chromate treatment; however, the antirust treatments to which the present invention can be applied is not restricted to the above-mentioned treatment.

For example, a copper foil is immersed in an aqueous solution of benzotriazol-based antirust agent ($C_6H_5N_3$, concentration of 250 ppm) and then dried, whereby a chelate compound made from the copper and the benzotriazol-based antirust agent is formed on the surface of the copper foil; however, the antirust-treated layer is as thin as only one or two molecules, so that it can be effectively removed by ion beam radiation or the like. Similarly, the present invention can be applied to an antirust treatment with a benzotriazol derivative.

The present invention also can be applied to an antirust treatment with other organic antirust agent such as a silane coupling agent. The silane coupling agent is a compound generally expressed in the chemical formula: $X-Si(OR)_3$, where X is a group reactive with an organic substance, such as amino group, vinyl group, and epoxy group, and OR is a group capable of being hydrolyzed such as methoxy group or ethoxy group. Thus, the silane coupling agent functions as a binder between an organic material and an inorganic material. An antirust treatment can be applied by immersing a copper foil in an aqueous solution of the silane coupling agent for 5 seconds and then drying it. The antirust-treated layer formed by such an antirust treatment can be effectively removed by ion beam radiation or the like.

According to the present invention, diffusion of a current collector material into a thin film is improved, making it possible to provide an electrode for a secondary battery with the thin film that is excellent in adhesion to the current collector and with excellent cycle characteristics.

What is claimed is:

1. A method of manufacturing an electrode for a secondary battery by depositing a thin film composed of active material on a current collector in which a surface-treated layer is formed, comprising the steps of:

removing at least part of said surface-treated layer by etching the surface of said current collector with an ion beam or plasma in order to improve the diffusion of said current collector material into said thin film; and depositing said thin film by CVD, sputtering, vacuum evaporation, thermal spraying or a plating method directly on the surface of said current collector subjected to said etching step to form said electrode.

2. The method of manufacturing the electrode for the secondary battery according to claim 1, where said ion beam or plasma is that of argon or hydrogen.

3. The method of manufacturing the electrode for the secondary battery according to claim 1, where said surface-treated layer is either an antirust-treated layer or a surface oxide film of the current collector.

4. The method of manufacturing the electrode for the secondary battery according to claim 3, where said antirust-treated layer or said surface oxide film is etched by an ion beam of argon or hydrogen.

5. The method of manufacturing the electrode for the secondary battery according to claim 1, wherein the temperature of said current collector is in the range of 20 to 250° C., in said etching step and in said depositing step.

6. The method of manufacturing the electrode for the secondary battery according to claim 1, wherein said etching step and said depositing step are performed in succession in a same reaction chamber.

7. The method of manufacturing the electrode for the secondary battery according to claim 1, wherein the diffusion of said current collector material into said thin film is promoted within a range where the intermetallic compound of said active material and said current collector material is not formed.

8. The method of manufacturing the electrode for the secondary battery according to claim 1, wherein said thin film is mainly composed of Si.

9. The method of manufacturing the electrode for the secondary battery according to claim 1, wherein at least the surface portion of said current collector is made of Cu or its alloy, and said current collector material to be diffused into said thin film is Cu.

* * * * *